Sept. 25, 1928.
H. V. ATWELL
1,685,516
LIQUID SEAL
Filed Nov. 5, 1925
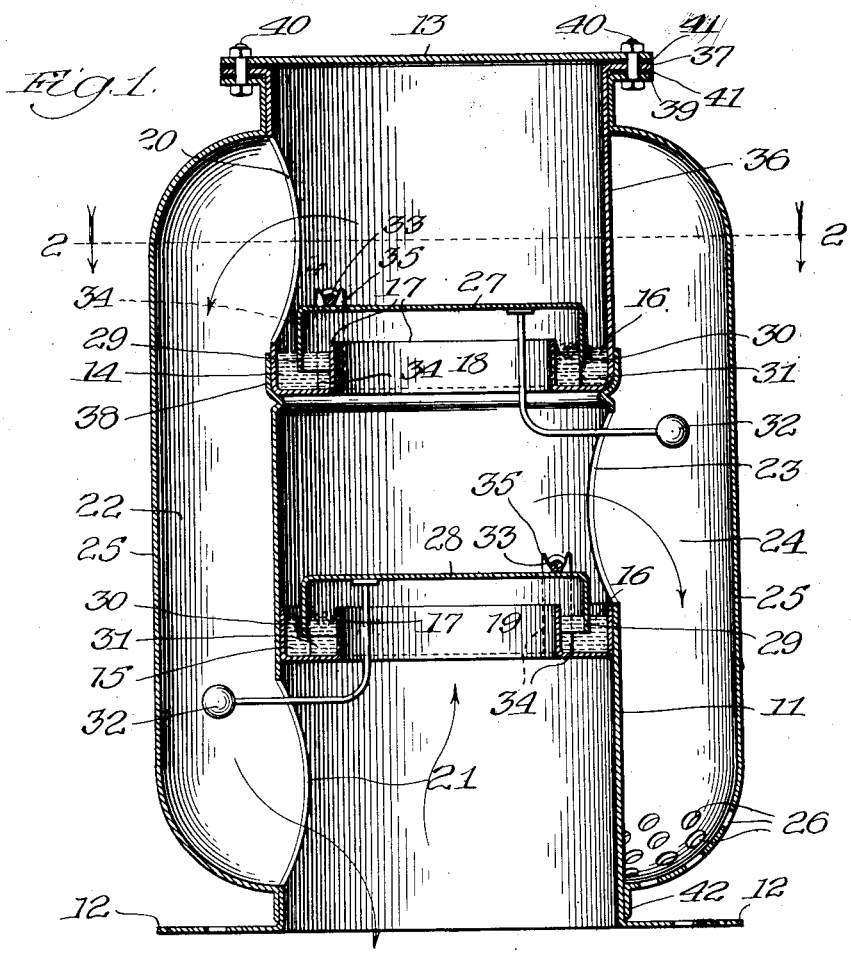
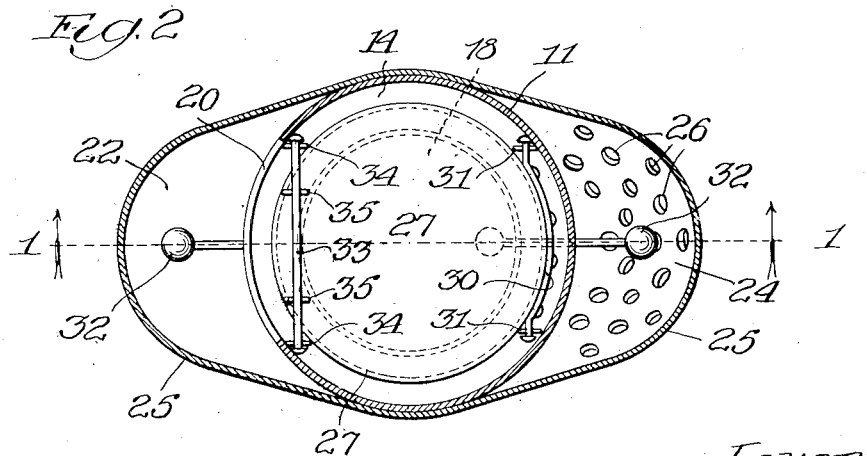
Inventor:
Harold V. Atwell, Patented Sept. 25, 1928.

1,685,516

UNITED STATES PATENT OFFICE.

HAROLD V. ATWELL, OF WHITING, INDIANA, ASSIGNOR TO STANDARD OIL COMPANY, OF WHITING, INDIANA, A CORPORATION OF INDIANA.

LIQUID SEAL.

Application filed November 5, 1925. Serial No. 67,188.

This invention relates to improvements in sealing devices and more particularly to seals for storage tanks containing volatile liquids such as gasoline, petroleum and the like.

The invention will be readily understood from the accompanying drawings in which Fig. 1 illustrates in sectional elevation on the line 1—1 of Fig. 2, a preferred embodiment of the improved seal, and Fig. 2 illustrates a section on the line 2—2 of Fig. 1.

This preferred embodiment comprises a vertical casing 11, provided at its lower end with a flange 12 for attachment to the vent pipe or other part of the storage tank, and is closed at its upper end by the cap 13. The casing 11 is provided with superimposed spaced channels 14, 15 which extend around the inner walls of the casing 11 and preferably conform to cross-sectional configuration of the casing. The channels 14 and 15 are provided with sealing liquid 16, and in order to attain economy in the use of such sealing liquid the channels 14 and 15 should be of small width, but at the same time of sufficient size to permit the free operation of the moving parts hereafter to be described. The inner vertical walls 17 of the channels 14 and 15 constitutes vent openings or pipes 18 and 19 of substantial cross-sectional area for the free passage of air or vapor therethrough when the seal comes into operation. Above the channel 14 and below the channel 15, the casing 11 is provided with openings 20 and 21, and a conduit 22 is provided on the exterior of the casing 11 which brings said openings into communication with each other, while preventing access to the open air. Between the channels 14 and 15, the casing 11 is provided with an opening 23 which communicates with the open air. A conduit 24 is preferably constituted by the casing 25, exteriorly of the opening 23 to protect same from the elements. Said conduit 24 communicates with the open air by means of perforations 26. Each of the vapor passages 18 and 19 is normally closed by inverted cups 27, 28, each being provided with a downwardly extending skirt 29, normally immersed in the liquid 16. The inverted cups 27, 28 are pivoted about horizontal axes in any suitable manner. For example, the depending skirts 29 may be provided with pins 30, which rest on V-slotted bearings 31 located in the channels 14, 15. The inverted cups 27, 28 are provided with counterpoises 32 and preferably with rods 33, which are supported by V-slotted supports 34 mounted in the channels 14, 15, and by V-slotted supports 35 mounted on the cups 27, 28. It is preferred that the inverted cups 27 and 28 shall be exactly balanced by the counterpoises 32, so that the excess pressure, whereby the cups are opened, is predetermined solely by the moments of the rods 33. By substituting rods of different mass the permissible pressure difference may be adjusted with both ease and accuracy.

The apparatus may be made in sheet or cast metal. In the form of invention illustrated the conduits 22 and 24 are constituted by an outer casing 25 which makes contact with and is preferably connected by welding, soldering or the like, with the casing 11 at diametrically opposite sides thereof, as well as at its lower end 42. In order to permit easy examination, adjustment and replenishment of sealing liquid, it is preferred to make the upper portion 36 of the casing 11, removable. This portion 36 comprises the channel 14, the vertical tubular portion thereabove and the upper flange 37, and is adapted to fit snugly between opposite sides of the outer casing 25, so as to prevent passage of vapors or air between the conduits 22 and 24 except through the passages 18, 19. The upper end 38 of the lower part of casing 11 is so shaped as to receive the upper portion 36 and make an air-tight joint therewith. The outer casing 25 is provided with a flange 39. The cap 13 and flanges 37 and 39 may be held together by bolts 40 or other suitable means, preferably with the interposition of suitable gaskets 41.

The apparatus described requires a very small quantity of sealing fluid and for this purpose it is possible to use mercury, provided the gasoline or the like has no "doctor" reaction. Other sealing liquids, such as glycerine and calcium chloride solution and the like may be employed.

The operation of the device is as follows: When excess pressure of or exceeding a predetermined amount over the atmospheric pressure, is generated in the storage tank or the like, the excessive pressure acts upon the under side of the cup 28 thereby causing it to rise about its axis 30 until its skirt 29 rises above the surface of the liquid, leaving free access to the open air through vent 19 opening 23 conduit 24 and perforations 26. At the same time the rod 33 is raised off its supports 34 by the supports 35 on the cup 28. When the excessive pressure is sufficiently relieved, the cup 28 resumes its normal position since the reduced pressure will not be sufficient to keep it in its elevated position. When the cup 28 reaches its normal or closed position, any tendency for it to rock is avoided because the weight of the rod 33 is transferred to the supports 34 in the event that the plate 28 descends below its normal position, and the cup system immediately becomes unbalanced in a sense directly opposite to the motion of the plate. Should however, the pressure within the storage tank or the like become less than atmospheric pressure by more than a predetermined amount, the excess pressure of the atmosphere acting through perforations 26, conduit 24 and opening 23, acts upon the lower surface of the inverted cup 27, thereby opening same and maintaining same open until the pressure difference is reduced to the predetermined amount by the passage of air through vent 18, whereupon the cup closes, rocking being prevented by the action of the rod 33 and supports 34 and 35 exactly as described in connection with cup 28.

I claim:

1. In a liquid seal, a pair of channels each surrounding a vent opening, sealing liquid in said channels, inverted pivoted cups normally closing said vent openings, and adapted to be operated and opened by a certain excessive pressure from below, the sides of said cups extending into said sealing liquid, means communicating from the under side of one cup and the upper side of the other cup with the open air, and means communicating from the upper side of one cup and the under side of the other cup with the vapor space of a liquid container.

2. A liquid seal comprising a vertical casing, spaced channels therein adapted to contain sealing liquid, each channel being provided with a centrally disposed vent opening having upwardly projecting walls, an inverted cup over each said opening, its sides entering the liquid to form a seal, means for pivotally supporting each cup at one side of the corresponding vent opening, means for counterbalancing each cup and means for establishing communication between a vapor conduit and opposite sides of the two cups, the other side of each cup communicating with the atmosphere.

3. A liquid seal comprising a vertical chamber, a pair of superimposed channels each having a vent opening therethrough, sealing liquid in said channels, an inverted cup normally closing each vent opening, the sides thereof extending into said liquid, said cups being adapted to be moved into the open position by an excess pressure thereunderneath, a conduit on one side of the chamber, said chamber being provided with an opening thereinto between said channels and said conduit being provided with openings communicating with the open air, a second conduit on another side of said chamber, said chamber being provided above the upper channel and below the lower channel with openings into said second conduit, and means for attaching the seal to a liquid container to bring the under side of the lower cup into communication with the vapor space of said liquid container.

4. In combination, an open vent-pipe, a liquid containing channel surrounding said pipe, an inverted cup over said vent-pipe and having its sides immersed in the liquid in said channel, pivot means for said inverted cup at one side thereof whereby the cup may be tilted upwardly to permit the escape of vapor from the vent, means extending downwardly from the underside of said cup and rearwardly of said pivot means for counterbalancing the weight of said inverted cup and means to prevent rocking of the seal.

5. In combination, an open vent-pipe, a liquid containing channel surrounding said pipe, an inverted cup over said vent-pipe and having its sides immersed in the liquid in said channel and pivotally supported at a circumferential edge thereof, whereby the cup may be tilted upwardly to permit the escape of vapor from the vent, means for counter-balancing the weight of said inverted cup and variable means to prevent rocking of the seal.

6. In combination, an open vent-pipe, a liquid containing channel surrounding said pipe, an inverted cup over said vent-pipe and having its sides immersed in the liquid in said channel and pivotally supported at a circumferential edge thereof, whereby the cup may be tilted upwardly to permit the escape of vapor from the vent, and interchangeable means of varying masses for counter-balancing the weight of said inverted cup.

HAROLD V. ATWELL.